United States Patent [19]
James

[11] 3,913,700
[45] Oct. 21, 1975

[54] TRANSMISSION SHIFT INHIBITOR

[75] Inventor: Larry Rodger James, Olathe, Kans.

[73] Assignee: Paccar Inc., Bellevue, Wash.

[22] Filed: Oct. 22, 1974

[21] Appl. No.: 516,913

Related U.S. Application Data

[63] Continuation of Ser. No. 409,707, Oct. 25, 1973, abandoned, which is a continuation of Ser. No. 229,519, Feb. 25, 1972, abandoned.

[52] U.S. Cl. .............................. 180/82 R; 192/4 C
[51] Int. Cl.² ........................................ F16D 67/00
[58] Field of Search ...... 180/82 R, 70 R, 77 R, 103; 192/4 C; 74/336.5

[56] References Cited
UNITED STATES PATENTS

| | | | |
|---|---|---|---|
| 3,250,142 | 5/1966 | Schuster | 180/70 R X |
| 3,348,644 | 10/1967 | Hilpert | 192/4 C |
| 3,363,732 | 1/1968 | Nakamura | 192/4 C |
| 3,381,770 | 5/1968 | Fauchere | 180/77 R |
| 3,386,523 | 6/1968 | Ruhl | 192/4 C X |
| 3,400,790 | 9/1968 | Ruhl | 192/4 C X |
| 3,437,184 | 4/1969 | Wilson | 192/4 C X |
| 3,540,556 | 11/1970 | Snoy | 192/4 C |
| 3,543,891 | 12/1970 | Mathers | 192/.094 |
| 3,692,160 | 9/1972 | Hilpert | 192/4 C |

*Primary Examiner*—David Schonberg
*Assistant Examiner*—T. L. Siemens
*Attorney, Agent, or Firm*—Seed, Berry, Vernon & Baynham

[57] ABSTRACT

A control system for use on automotive type vehicles whereby if the operator moves the shift control lever to a position directing reversal of vehicle movement while the vehicle is still moving the brakes will be applied, the engine reduced to an idle condition and once the vehicle has come to a stop the shift will be completed, the accelerator returned to its operating rpm and the brakes released. The vehicle is intended to be entirely operator controlled and this control system serves as a safety mechanism preventing an inadvertent placing of the transmission in a gear opposite to the direction of travel of the vehicle.

6 Claims, 1 Drawing Figure

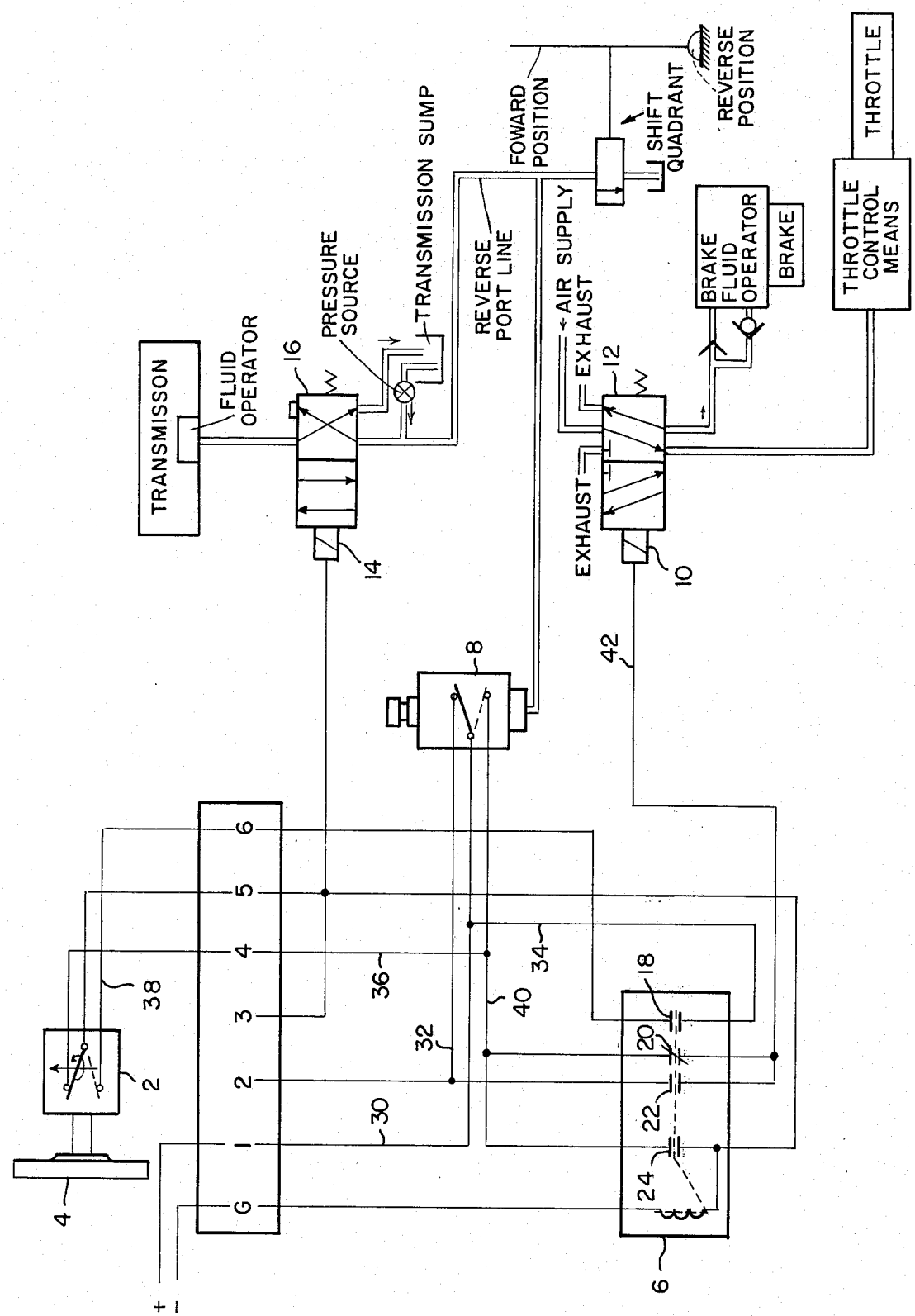

TRANSMISSION SHIFT INHIBITOR

This is a continuation of application Ser. No. 409,707 filed 10/25/73 which is a continuation of Ser. No. 229,519 filed Feb. 25, 1972, both abandoned.

BACKGROUND OF THE INVENTION

The present invention is primarily directed, but not limited to, heavy duty vehicles such as log loaders or the like. One of the inherent problems with equipment of this type is that in the rush to complete delivery of a load the operator will shift the vehicle, which normally would have an automatic transmission with several forward and several reverse gears to a reversing gear, changing torque, to the direction opposite to which the vehicle is going prior to complete stoppage of the vehicle. It is immediately obvious that the inertia involved when talking about a vehicle of this size will put a tremendous strain upon the drive train, often resulting in breakage.

It is known in the art to have mechanisms for preventing the movement of a shift level from a forward to a reverse direction or vice versa if the vehicle is moving. These mechanisms usually involve a physical stop upon the shift tower. It is also known in the art to have control systems which prevent the actual shifting of the gear train from one direction to the other until the vehicle has come to rest.

These prior art systems, however, are designed primarily for use upon non-industrial vehicles where they are less subject to abuse and contamination by adverse elements. Further, these prior art devices while preventing a shift do not perform the necessary function of placing the vehicle in a proper condition to perform a safe and non-destructive shift.

With the above known art and problems in mind it is an object of the present invention to provide a shift inhibitor for use upon an automotive type vehicle wherein the operator has complete control of the vehicle as far as direction, acceleration, braking or the like and the control system is only engaged when the operator either through inadvertence or in haste places the shift control to a position which directs the drive of the vehicle in a direction opposite to that which the vehicle is traveling.

It is another object of the present invention to provide a control system for use upon an automotive vehicle which, in a given predetermined situation, will take over control of the vehicle, bring it to a halt, decelerate the engine to an idle condition and then shift the gears to the reverse direction upon preselection at the shift control.

It is still another object of the present invention to provide a control system for use on an automotive vehicle wherein the vehicle is brought to a complete rest, a gear shift is accomplished automatically and then the brakes released and the accelerator control again returned to the operator such that he is in complete control of the acceleration of the vehicle in the new direction but cannot shift the drive to a reversing direction prior to stoppage of the vehicle.

BRIEF DESCRIPTION OF THE DRAWING

The FIGURE is a schematic view of the composite electronic, hydraulic and pneumatic circuit which comprises the preferred embodiment of the present control system.

DETAILED DESCRIPTION OF THE DRAWING

As can be seen in the FIGURE the main control elements of the presently described shift inhibitor mechanism comprises a speed sensor 2 which is a single pole double throw switch that senses the output from the torque converter 4 directly and thus vehicle ground speed indirectly. In the preferred embodiment the switch is deactivated at low ground speed or standstill condition, i.e. 0 to 400 rpm and actuates at 450 rpm.

A second basic element of the control system is a four-pole double-throw control relay 6 controlled by signals applied through the speed sensor 2 and/or the pressure switch hereinafter described. The contacts of this relay control the operation of the solenoids which, as hereinafter described under predetermined conditions move shuttle control valves which perform the desired shift inhibiting function.

A direction control pressure switch 8 which is a single pole double throw switch receives its signal from the reverse port of the shift quadrant. This switch is deenergized when the shift lever is in a reverse gear position i.e. no pressure in the reverse port line of the shift quadrant. The switch opens when the shift lever is in neutral or a forward gear i.e. when pressure is in the reverse port line of the shift quadrant.

There are two solenoids necessary in the preferred embodiment of the present invention and the first solenoid 10 controls a four-way five port air valve 12. When the solenoid is deenergized air is supplied through the normally open port to a foot operated throttle and blocks air to the brakes thus allowing motion of the vehicle. When the solenoid is energized, however, the throttle supply is blocked by the now closed normally open port and the throttle lines exhausted of any air which causes the engine to go to low idle. In this position the air passes through the now open, normally closed port to the brake system and brakes the vehicle.

The second solenoid 14 operates a two position flow control valve 16 that utilizes the same oil pressure supply as the shift quadrant. In the deenergized position i.e. valve closed, oil pressure is blocked to the fluid operator of the transmission i.e. the transmission is in a reverse gear whereas in the energized position (valve open) oil pressure is applied to the fluid operator of the transmission to cause a condition wherein the transmission is in its forward gear or neutral conditions depending upon the shift lever position.

As seen in the diagram there are included the necessary inter connections for operation of the circuit and these will be denoted in the following description which will specifically point out the various conditions which may exist and the resultant conditions of the various elements.

The first case to be discussed is when the vehicle is in a stopped condition and the shift lever is in reverse. This is the condition which is shown in the diagram speed sensor 2 is not actuated, the pressure switch 8 is deenergized and there is no pressure in the reverse port line of the shift quadrant. When in this condition electric line 30 is electrically inter connected via switch 8 to line 32 and thus to open relay contact 16. Potential is also directed via line 34 to open relay contact 18. The relay coil 6 is also in a deenergized or open condition and relay contacts 18, 22 and 24 are open whereas relay contact 20 is closed. The air control valve 12 is in the position assumed when the solenoid 10 is deenergized since no current is transmitted thereto and air is supplied to the throttle whereas no air is supplied to the brake system. The solenoid 14 which controls the oil control valve 16 is similarly deenergized and there is no oil supplied to the reverse port of the transmission. The speed sensor is deactuated since the vehicle, as assumed above is stopped.

If the vehicle operator depresses the throttle, the vehicle will now accelerate and a second situation occurs where the vehicle is moving in reverse. All of the elements will be in the same condition as in the case just described with the exception of the speed sensor 2 which is now actuated because the vehicle is moving. In the actuated condition the contact of the speed sensing switch will move from the position as shown in solid contacting line 36 to that as shown in phantom contacting line 38.

If the operator, now with the vehicle moving in reverse, shifts the control level to a forward position. The pressure switch 8 will be immediately energized since there is pressure introduced to the reverse port line of the shift quadrant. The switch is shifted for contact with line 32 to contact with line 40. The relay coil 6 stays in its deenergized condition i.e. relay contacts 18, 22 and 24 remain open and relay contact 20 remains in its normally closed condition. The oil control valve 16 remains deenergized as there is no oil pressure to the reverse port of the transmission shift lever since the transmission is in a reverse gear position. However the air control valve 12 is shuttled since solenoid 10 is energized, power being supplied via lines 30, 40 relay contact 20 and line 42. The air supply to the throttle is blocked which causes the engine to go to a low idle condition and air is applied to the brakes causing the vehicle to stop. It is to be noted that the speed sensor 2 is still actuated since the vehicle is still moving.

Now as a result of the sequence of events described in the paragraph immediately above or alternatively as a result of complete control by the driver, the vehicle has been brought to a stop. The shift lever remains in forward control position. Pressure switch 8 remains energized and there is pressure in the reverse port line of the shift quadrant. When the vehicle is substantially stopped relay coil becomes energized by action of speed sensor switch 2 and relay contacts 18, 22 and 14 are closed whereas relay contact 20 is open. The air valve solenoid 10 is now deenergized and air is again supplied to the throttle. The brakes are released since no air is supplied to that line. The solenoid 14 is energized and the oil pressure is supplied to the reverse port of the transmission.

When the vehicle is moving in a forward direction with the shift lever in a forward position, the condition of the control system will be the same as described in the paragraph immediately above with the exception of the fact that the speed 2 is now actuated since the vehicle is moving.

Now with the vehicle moving forward, if the operator moves the shift lever to reverse the pressure switch 8 will be deenergized since no pressure will be in the reverse port line of the shift quadrant. The relay coil 6 will be retained in its energized condition as noted above. However, the deenergization of the pressure switch will cause the air valve 10 to be energized and the air supplied to the throttle blocked reducing the engine to a low idle. Air will be supplied to the brakes causing the vehicle to stop. The oil control valve will likewise be energized and oil will be channeled to the reverse port of the transmission since the transmission is in forward gear. The speed sensor will remain actuated since the vehicle is moving. As a result of either independent operation by the operator or by operation of the shift inhibitor, the vehicle will be brought to a stop with the shift lever in reverse and the entire system will return to that initially described and that condition as shown in the schematic diagram.

It is to be understood that on vehicles without a shift lock inhibitor the operator can move the shift lever to a reversing gear while the machine is moving at any speed up to top speed and when this happens the transmission immediately shifts to the newly selected gear. Severe strain is placed on the transmission and drive components which often results in failure. The device as described above will meet the following requirements in sequence. When the operator moves the shift lever from forward to reverse the device holds the transmission in the forward gear, lowers the engine speed to idle, applies the brake until the vehicle stops then allows the transmission to shift to reverse releases the brake and allows the engine speed to increase. When the operator moves the shift lever from reverse to forward and the vehicle is moving in reverse, the device holds the transmission in reverse, lowers the engine speed to idle, applies the brake until the vehicle stops and allows the transmission to shift to forward. It then releases the brake and allows the engine speed to increase.

It is to be understood that the above described shift shock inhibitor in no way interfers with the process of the normal operation of the vehicle and only does what the driver should do when making a reversing shift. However, if the driver inadvertently leaves the throttle full open, does not appply the brakes and places the shift lever in a reverse gear the system is activated and performs the proper sequence of events as described above. Further, this mechanism adds another dimension to the operator control, enabling the operator to stop and reverse the vehicle without removing his foot from the accelerator.

The embodiments of the invention in which an exclusive property or privilege is claimed are defined as follows:

1. An automatic reverse control system for a vehicle having a torque producing variable speed engine, manually controlled throttle means for controlling engine speed, traction means for moving the vehicle in forward and reverse directions, manually controlled brake means for selectively stopping movement of the vehicle and shiftable transmission means for selectively transmitting engine torque from the engine to the traction means in one of two directions to cause forward and reverse movement of the vehicle, wherein the automatic reverse control system comprises a. a first fluid operator means for shifting the shiftable transmission means into a forward torque transmitting condition when fluid pressure is applied thereto and for shifting the shiftable transmission means into a reverse torque transmitting condition upon relief of fluid pressure therefrom;

b. a second fluid operator means for automatically applying the brake means when fluid pressure is applied thereto;

c. automatic fluid pressurized throttle control means for allowing manual control of the throttle means upon application of fluid pressure thereto and for disabling the throttle means to cause the engine to idle when fluid pressure is relieved therefrom;

d. first electrically controlled valve means for selectively applying pressurized fluid to said first fluid operator means when electrically energized, and for relieving fluid pressure from said first fluid operator when electrically de-energized;

e. second electrically controlled valve means for applying simultaneously fluid pressure to said second fluid operator means and relieving fluid pressure from said automatic fluid pressurized throttle control means when electrically energized and for applying simultaneously fluid pressure to said automatic fluid pressurized throttle control means and relieving fluid pressure from said second fluid operator means when electrically de-energized; and f. automatic vehicle reversing control means for automatically reversing the vehicle by shifting the shiftable transmission means only after the vehicle has substantially stopped, said automatic vehicle reversing control means including
  1. a direction control switch operable between a first state which indicates that a forward vehicle direction is desired and a second state which indicates that a reverse vehicle direction is desired.
  2. a speed indication switch operable between a first state which indicates that the vehicle has substantially stopped and a second state which indicates that the vehicle is moving, and
  3. circuit means connected with said first and second electrically controlled valve means for controlling the energization of said second electrically controlled valve means whenever said direction control switch is in a state indicative of a desired direction different from the actual direction of movement of the vehicle and for inhibiting a change in the state of energization of said first electrically controlled valve means until said speed indication switch is in said first state whereby the direction of the vehicle may be reversed automatically by changing the state of said direction control switch and said first electrically controlled valve is operative to shift the transmission means only when the vehicle is substantially stopped.

2. A control system as defined in claim 1, wherein said direction control switch includes first, second and third terminals, said first and second terminals being electrically connected when said direction control switch is in the first state and said first and third terminals being electrically connected when said direction control switch is in the second state.

3. A control system as defined in claim 2, wherein said speed indication switch includes first, second and third terminals, said first and second terminals of said speed indication switch being electrically connected when said speed indication switch is in said first state and said first and third terminals of said speed indication switch being electrically connected when said speed indication switch is in said second state.

4. A control system as defined in claim 3, wherein said automatic vehicle reversing control means includes a control relay including a solenoid, first, second and third contacts adapted to close when said solenoid is energized; and a fourth contact adapted to open when said solenoid is energized; each said contact including first and second terminals; said automatic vehicle reversing control means being characterized by a. said first terminal of said first contact being electrically connected with said solenoid said first electrically controlled valve means and said first terminal of said speed indication switch;

b. said second terminal of said first contact being electrically connected with said second terminal of said fourth contact, said second terminal of said speed indication switch and said second terminal of said direction control switch;

c. said first terminal of said second contact being electrically connected with said first terminal of said fourth contact and said second electrically controlled valve means.

d. said second terminal of said second contact being electrically connected with said third terminal of said direction control switch;

e. said first terminal of said third contact being electrically connected with said first terminal of said direction control switch; and f. said second terminal of said third contact being electrically connected with said third terminal of said speed indication switch.

5. A control system as defined in claim 1, wherein said direction control switch is fluid pressure responsive, and said automatic vehicle reversing control circuit means includes a shift quadrant for selectively applying fluid pressure to said direction control switch to selectively change said direction control switch between said first and second states.

6. A control system as defined in claim 5, wherein said shift quadrant controls the application of fluid pressure to said first electrically controlled valve means.

* * * * *